United States Patent
Kasperchik et al.

(10) Patent No.: US 11,673,330 B2
(45) Date of Patent: Jun. 13, 2023

(54) METALLIC BUILD MATERIAL GRANULES

(71) Applicant: HEWLETT-PACKARD DEVELOPMENT COMPANY, L.P., Houston, TX (US)

(72) Inventors: Vladek Kasperchik, Corvallis, OR (US); Michael G. Monroe, Corvallis, OR (US); Johnathon Holroyd, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 925 days.

(21) Appl. No.: 16/081,497

(22) PCT Filed: Apr. 28, 2017

(86) PCT No.: PCT/US2017/030209
§ 371 (c)(1),
(2) Date: Aug. 31, 2018

(87) PCT Pub. No.: WO2018/199995
PCT Pub. Date: Nov. 1, 2018

(65) Prior Publication Data
US 2021/0197257 A1 Jul. 1, 2021

(51) Int. Cl.
*B33Y 10/00* (2015.01)
*B33Y 40/10* (2020.01)
(Continued)

(52) U.S. Cl.
CPC .......... *B29C 64/314* (2017.08); *B22F 1/102* (2022.01); *B22F 1/17* (2022.01); *B22F 10/16* (2021.01);
(Continued)

(58) Field of Classification Search
CPC ........ B22F 1/0062; B22F 10/10; B22F 10/85; B22F 2304/10; B22F 10/20; B22F 12/00;
(Continued)

(56) References Cited

U.S. PATENT DOCUMENTS 6,764,601 B1   7/2004 Levy
9,421,612 B2   8/2016 Fang et al.
(Continued)

FOREIGN PATENT DOCUMENTS

CN    102166648 A    8/2011
CN    102188933 A    9/2011
(Continued)

OTHER PUBLICATIONS

Carreño-Morelli et al., Three-Dimensional Printing of Stainless Steel Parts, Materials Science Forum vols. 591-593 (2008) pp. 374-379 20. © (2008) Trans Tech Publications, Switzerland, Online: Aug. 19, 2008 (Year: 2008).*

(Continued)

*Primary Examiner* — Rebecca Janssen
(74) *Attorney, Agent, or Firm* — Dierker & Kavanaugh, P.C.

(57) ABSTRACT

A metallic build material granule includes a plurality of primary metal particles and a temporary binder agglomerating the plurality of primary metal particles together. The primary metal particles have a primary metal particle size ranging from about the 1 μm to about 20 μm. The primary metal particles are non-shape memory metal particles, and the metallic build material granule excludes shape memory metal particles.

14 Claims, 6 Drawing Sheets

(51) Int. Cl.
- *B33Y 70/10* (2020.01)
- *B22F 1/102* (2022.01)
- *B33Y 70/00* (2020.01)
- *B22F 10/16* (2021.01)
- *B29C 64/314* (2017.01)
- *B33Y 30/00* (2015.01)
- *B29C 64/165* (2017.01)
- *B22F 1/17* (2022.01)
- *B33Y 50/02* (2015.01)
- *B29C 64/393* (2017.01)
- *B22F 10/85* (2021.01)
- *B22F 12/10* (2021.01)

(52) U.S. Cl.
CPC .......... *B29C 64/165* (2017.08); *B33Y 10/00* (2014.12); *B33Y 30/00* (2014.12); *B33Y 40/10* (2020.01); *B33Y 70/00* (2014.12); *B33Y 70/10* (2020.01); *B22F 10/85* (2021.01); *B22F 12/10* (2021.01); *B22F 2304/10* (2013.01); *B29C 64/393* (2017.08); *B33Y 50/02* (2014.12)

(58) Field of Classification Search
CPC .......... B22F 2998/10; B22F 2999/00; B22F 1/0059; B22F 1/02; B33Y 10/00; B33Y 30/00; B33Y 40/10; B33Y 70/10; B33Y 50/02; B33Y 70/00; B29C 64/314; B29C 64/165; B29C 64/393; B29C 64/205; Y02P 10/25
See application file for complete search history.

(56) References Cited

U.S. PATENT DOCUMENTS

| | | | |
|---|---|---|---|
| 2003/0224932 A1 | 12/2003 | Saaski et al. | |
| 2005/0276976 A1 | 12/2005 | Pfeifer et al. | |
| 2006/0251535 A1* | 11/2006 | Pfeifer | B22F 1/0062 419/36 |
| 2011/0209575 A1 | 9/2011 | Kadomura | |
| 2011/0217555 A1 | 9/2011 | Kadomura | |
| 2013/0108872 A1* | 5/2013 | Magome | C08K 3/34 106/203.3 |
| 2014/0141137 A1* | 5/2014 | Coyne | A23L 2/44 426/295 |
| 2015/0069649 A1* | 3/2015 | Bai | C04B 35/528 264/129 |
| 2015/0114178 A1 | 4/2015 | Ishigami et al. | |
| 2015/0291921 A1 | 10/2015 | Rives | |
| 2016/0158843 A1 | 6/2016 | Yolton et al. | |
| 2016/0199912 A1 | 7/2016 | Tamura | |
| 2016/0368057 A1 | 12/2016 | Hopkins et al. | |
| 2017/0001377 A1 | 1/2017 | Meisner et al. | |
| 2017/0297108 A1* | 10/2017 | Gibson | B22F 3/22 |

FOREIGN PATENT DOCUMENTS

| | | |
|---|---|---|
| CN | 104593693 A | 5/2015 |
| CN | 110198796 A | 9/2019 |
| EP | 1770176 A1 | 4/2007 |
| EP | 1524049 | 8/2009 |
| JP | 2006-521264 A | 9/2006 |
| JP | 2011179051 | 9/2011 |
| JP | 2011202275 | 10/2011 |
| JP | 2015180763 | 10/2015 |
| JP | 2016-179638 A | 10/2016 |
| JP | 2016190322 | 11/2016 |
| JP | 2018090841 | 6/2018 |
| JP | 2018536770 | 12/2018 |
| JP | 2020-505512 A | 2/2020 |
| RU | 2217266 C2 | 11/2003 |
| WO | 2014/028679 A1 | 2/2014 |
| WO | WO-2015194678 | 12/2015 |
| WO | 2016053305 A1 | 4/2016 |
| WO | 2016116562 A1 | 7/2016 |
| WO | 2018/199995 A1 | 11/2018 |

OTHER PUBLICATIONS

Sames et al., "The Metallurgy and Processing Science of Metal Additive Manufacturing", International Materials Reviews, Retrieved from internet—https://web.ornl.gov/sci/manufacturing/docs/pubs/The%20metallurgy%20and%20processing%20science%20of%20metal%20additive%20manufacturing.pdf, Mar. 7, 2016, 47 Pages.
M. Li et al.: "Comparison of Particle Size Distributions Measured Using Different Techniques", Particulate Science and Technology, vol. 23, No. 3, Feb. 24, 2007 (Feb. 24, 2007), pp. 265-284.

* cited by examiner

METALLIC BUILD MATERIAL GRANULES

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing or fusing or melting of the build material. For some materials, at least partial melting may be accomplished using heat-assisted extrusion, and for some other materials (e.g., polymerizable materials), curing or fusing may be accomplished using, for example, ultraviolet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
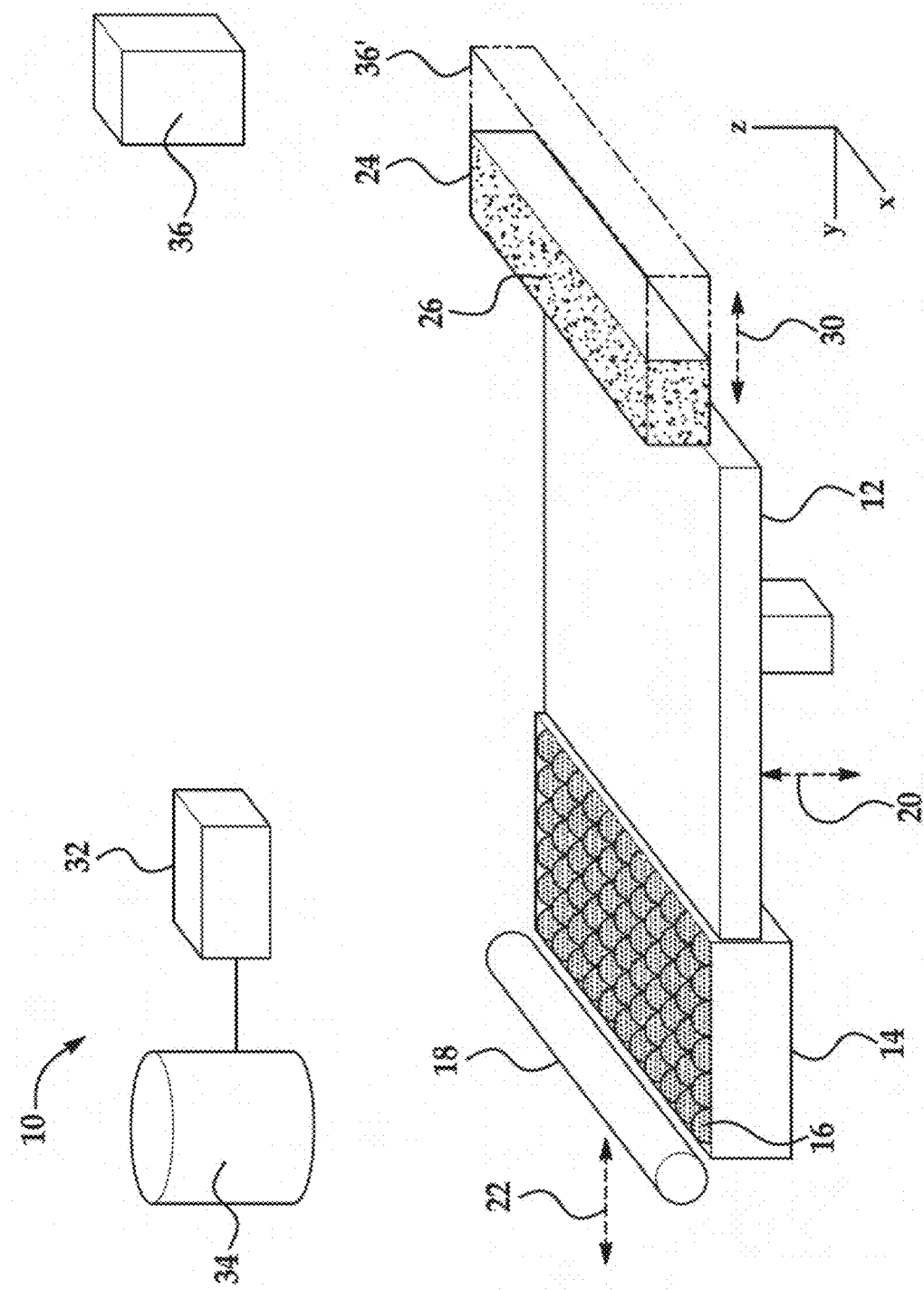
FIG. 1 is a simplified isometric and schematic view of an example 3D printing system disclosed herein.

In some examples of three-dimensional (3D) printing, a patterning agent (also known as a liquid functional agent/material) is selectively applied to a layer of build material, and then another layer of the build material is applied thereon. The patterning agent may be applied to this other layer of build material, and these processes may be repeated to form a green part (also referred to as a green body) of the 3D part that is ultimately to be formed. The patterning agent may include a binder that holds the build material particles of the green part together. The green part may then be exposed to electromagnetic radiation and/or heat to sinter the build material in the green part to form the 3D part.

The ability of the build material to be spread into thin layers with well controlled uniformity can affect the precision and quality of the 3D part that is formed. Build material particles that are less than 5 µm to 10 µm in size tend to form irregularly-shaped clumps due to strong Van Der Waals attraction between the particles. This clumping of build material degrades its ability to spread into thin layers, which can lead to 3D parts having imprecise shapes, varying structural properties, structural defects and/or varying visual qualities. Build material particles of at least 10 µm in size, and having a shape close to spherical, tend to spread well.

However, build materials, especially metallic build materials, with such a large particle size may introduce processing challenges when making high density, sintered parts. In order to achieve a high density part with larger metallic particles, process conditions are tightly controlled, which can make the process inefficient and/or difficult. This may be due, in part, to the fact that metallic particles tend to have very high melting temperatures (e.g., greater than 600° C., and in many cases more than 1000° C.), and that a higher target sintered density corresponds to maintaining a precise sintering temperature that is close to the melting temperature of the metallic particles. For example, sintering particles of steel alloys with an average diameter of about 30 µm to obtain a sintered density greater than 90% of theoretical density may include heating the particles to a sintering temperature ranging from about 2° C. below the melting temperature of the particles to about 5° C. below the melting temperature of the particles. In this example, the melting temperature of the particles of the steel alloys may range from about 1350° C. to about 1450° C. Thus, forming metallic parts with a high density (e.g., greater than 90% of theoretical density) using larger metal particles (e.g., having a particle size of or greater than 30 µm) may involve maintaining the sintering temperature, which may be greater than 1000° C., with a precision of ±1° C. for several hours.

Sintering larger metallic particles to achieve high density parts also tends to include sintering for longer sintering time periods. Sintering is a diffusion based process, and therefore, the sintering speed is dependent on the primary particle size. For the majority of metallic materials, the sintering rate is inversely proportional to the material particle diameter in a power ranging from 2 to 4. Thus, a decrease in build material particle diameter from 30 µm to 3 µm should accelerate its sintering rate by a factor of $10^2$ to $10^4$. A faster sintering time may produce a metallic part with a smaller grain size and better mechanical properties. Thus, it may be desirable to have a shorter sintering time.

Thus, utilization of metal particles with smaller particle sizes (e.g., 15 µm or less) may allow high density metallic parts (with desirable mechanical/structural properties) to be formed at lower sintering temperatures, with less stringent temperature control parameters (i.e., a wider temperature processing window), and shorter sintering time periods, which may provide energy savings and/or cost savings.

As one example, decreasing the size of the primary build material particles (e.g., to a particle size below about 15 µm, and in some instances, below about 10 µm) may allow a 3D part having a high density sintered state (e.g., a density greater than or equal to 90%, and in some instances 95%, of theoretical density) to be achieved by sintering at a sintering temperature ranging from about 10° C. below the melting temperature of the metallic particles to about 50° C. below the melting temperature and for a sintering time period ranging from about 1 hour to about 2 hours. As another example, primary metallic particles with a particle size ranging from about 2 µm to about 5 µm may be used to achieve a high density sintered state (e.g., a density greater than or equal to 95% of theoretical density) by sintering at a sintering temperature ranging from about 50° C. below the melting temperature of the metallic particles to about 200° C. below the melting temperature of the metallic particles and for a sintering time period ranging from about 30 min to about 1 hour. In these examples, the temperature during sintering may fluctuate to any temperature within the given ranges (and will depend on the metal and/or metal alloys used), and the high density can be achieved. As such, in the examples disclosed herein, precise ±1° C. temperature control is eliminated.

Examples of the method and system disclosed herein utilize a granular build material. Each build material granule is composed of primary metal particles and a temporary binder (which is at least partially soluble in a patterning fluid) that holds the primary metal particles together. The build material granules are large enough (e.g., ≥10 μm) to enable thin layers with well controlled uniformity to be formed during spreading.

As used herein, the term "temporary binder" refers to a binder that is present in the build material granules, but is removed during the 3D printing process, and thus, is not present in the final 3D part. Additionally, the temporary binder of the build material granules is selected so that it is at least partially soluble in a patterning fluid that is used during printing. Dissolution of the temporary binder physically breaks up the build material granules and converts them into layer of thick slurry of primary metal particles. The slurry is a layer of adequate structural uniformity that is composed of the primary metal particles, which can be densified as a result of binder dissolution and redistribution, fluid evaporation, and capillary forces to form a densified green part. The densified green part can be removed from the build material granules that were not patterned with the patterning fluid, without deleteriously affecting the structure of the densified green part. The extracted, densified green part can then undergo pyrolytic de-binding to produce an at least substantially binder-free gray part, and the at least substantially binder-free gray part may then undergo sintering to form the final 3D printed part/object. The primary metal particles are small enough (e.g., ≤10 μm to ≤15 μm) to sinter quickly (e.g., within about 10 minutes to about 4 hours at a target temperature for the particles) and to produce a 3D part with high sintered density (>90% to >95% of theoretical density) and good mechanical strength.

As used herein, the term "patterned green part" refers to an intermediate part that has a shape representative of the final 3D printed part, and that includes a slurry of primary metal particles, dissolved binder, and patterning fluid. The slurry is formed from the dissolution of the binder in the build material granules that are patterned with the patterning fluid. In the patterned green part, the primary metal particles may or may not be weakly bound together by attractive force(s) between the primary metal particles and the patterning fluid and/or by the temporary binder that is redistributed between the primary metal particles. In some instances, the mechanical strength of the patterned green part is such that it cannot be handled or extracted from a build material platform. Moreover, it is to be understood that any build material granules that are not patterned with the patterning fluid are not considered to be part of the patterned green part, even if they are adjacent to or surround the patterned green part.

As used herein, the term "densified green part" refers to a patterned green part from which the patterning fluid has at least substantially evaporated. At least substantial evaporation of the patterning fluid leads to densification of the part, which may be due to capillary compaction. The at least substantial evaporation of the patterning fluid may also allow the temporary binder to rebind the primary metal particles of the densified green part. In other words, the "densified green part" is an intermediate part with a shape representative of the final 3D printed part and that includes the primary metal particles rebound together by the temporary binder. Compared to the patterned green part, the mechanical strength of the densified green part is greater, and in some instances, the densified green part can be handled or extracted from the build material platform.

It is to be understood that the term "green" when referring to the patterned green part or the densified green part does not connote color, but rather indicates that the part is not yet fully processed.

As used herein, the term "at least substantially binder-free gray part" refers to a densified green part that has been exposed to a heating process that initiates thermal decomposition of the temporary binder so that the temporary binder is at least partially removed. In some instances, volatile organic components of, or produced by the thermally decomposed binder are completely removed and a very small amount of non-volatile residue from the thermally decomposed binders may remain. The small amount of the non-volatile residue is generally <2 wt % of the initial binder amount, and in some instances is <0.1 wt % of the initial binder amount. In other instances, the thermally decomposed binder (including any products and residues) is completely removed. In other words, the "at least substantially binder-free gray part" refers to an intermediate part with a shape representative of the final 3D printed part and that includes primary metal particles bound together as a result of i) weak sintering (i.e., low level necking between the particles, which is able to preserve the part shape), or ii) a small amount of the non-volatile binder residue remaining, and/or iii) a combination of i and ii.

It is to be understood that the term "gray" when referring to the at least substantially binder-free gray part does not connote color, but rather indicates that the part is not yet fully processed.

The at least substantially binder-free gray part may have porosity similar to or greater than the densified green part (due to temporary binder removal), but the porosity is at least substantially eliminated during the transition to the 3D printed part.

As used herein, the terms "3D printed part," "3D part," "metallic 3D part," or "metallic part" refer to a completed, sintered part.

Referring now to FIG. 1, an example of a 3D printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

Figure 3A:
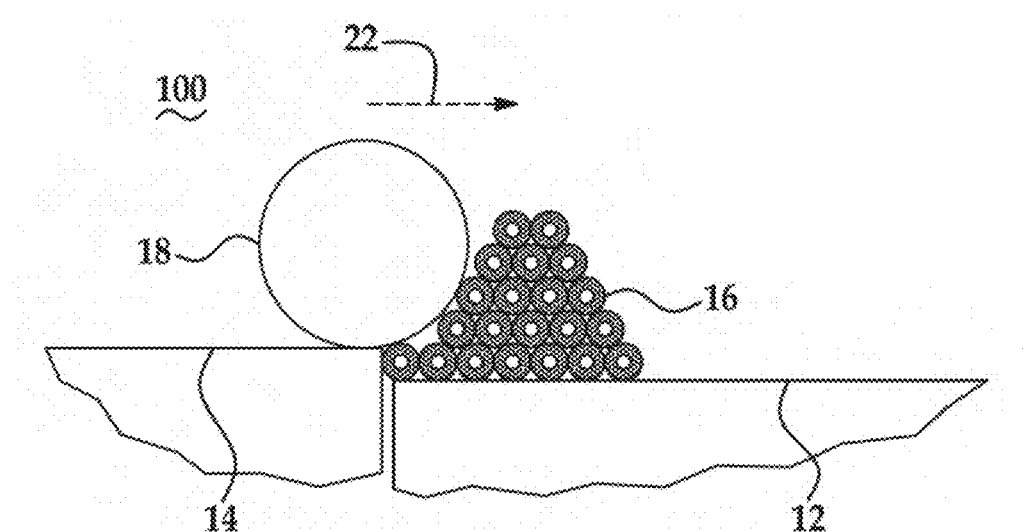
FIGS. 3A through 3F are schematic and partially cross-sectional views depicting the formation of a patterned green part, a densified green part, an at least substantially binder-free gray part, and a 3D metallic part using examples of a 3D printing method disclosed herein.
Figure 3B:
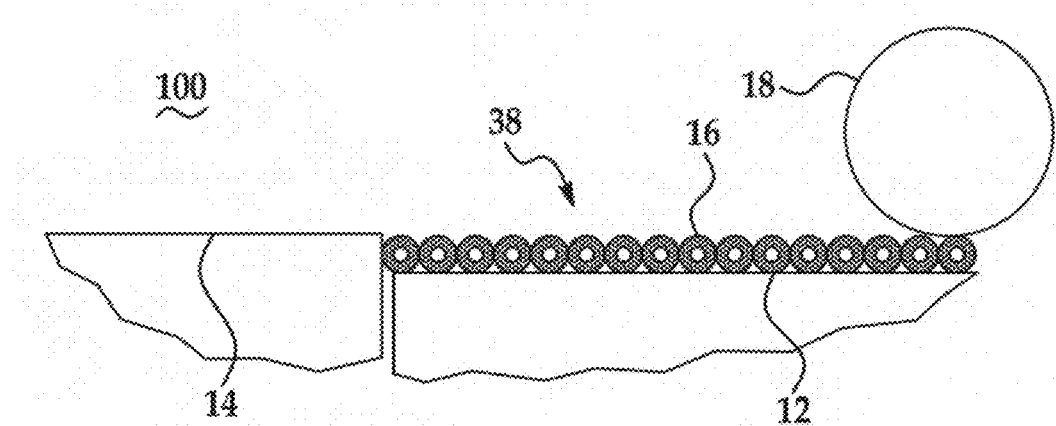
Figure 3C:
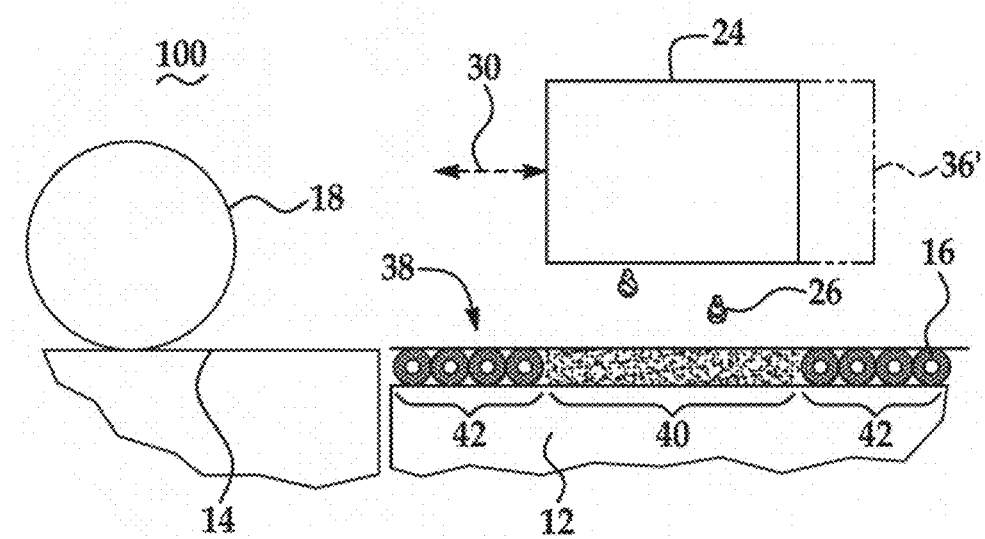

The three-dimensional (3D) printing system 10 generally includes a supply 14 of build material granules 16, each of the build material granules 16 consisting of a plurality of primary metal particles 28 agglomerated together by a temporary binder 29 that is at least partially soluble in a patterning fluid 26; a build material distributor 18; a supply of the patterning fluid 26; an applicator 24 for selectively dispensing the patterning fluid 26; a controller 32; and a non-transitory computer readable medium having stored thereon computer executable instructions to cause the controller 32 to: utilize the build material distributor 18 to dispense the build material granules 16; and utilize the applicator 24 to selectively dispense the patterning fluid 26 on at least a portion 40 of the build material granules 16 (see FIG. 3C).

As shown in FIG. 1, the printing system 10 includes a build area platform 12, the build material supply 14 containing build material granules 16, and the build material distributor 18.

The build area platform 12 receives the build material granules 16 from the build material supply 14. The build area platform 12 may be integrated with the printing system 10 or may be a component that is separately insertable into the printing system 10. For example, the build area platform 12 may be a module that is available separately from the printing system 10. The build area platform 12 that is shown is also one example, and could be replaced with another support member, such as a platen, a fabrication/print bed, a glass plate, or another build surface.

Figure 3D:
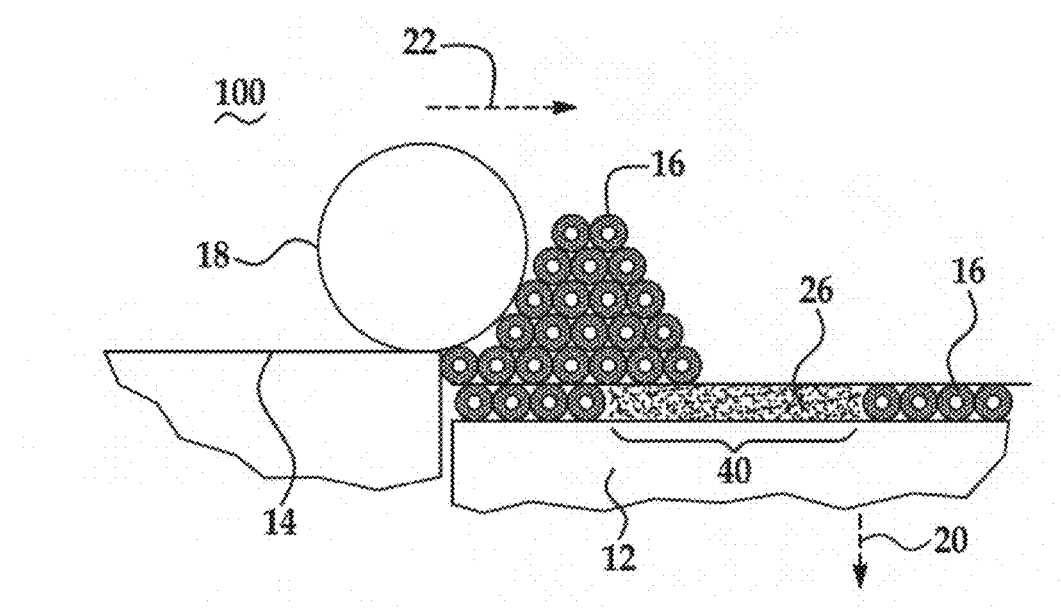

The build area platform 12 may be moved in a direction as denoted by the arrow 20, e.g., along the z-axis, so that the build material granules 16 may be delivered to the platform 12 or to a previously formed layer of patterned build material granules 16 (see FIG. 3D). In an example, when the build material granules 16 are to be delivered, the build area platform 12 may be programmed to advance (e.g., downward) enough so that the build material distributor 18 can push the build material granules 16 onto the platform 12 to form a layer 38 of the build material granules 16 thereon (see, e.g., FIGS. 3A and 3B). The build area platform 12 may also be returned to its original position, for example, when a new part is to be built.

The build material supply 14 may be a container, bed, or other surface that is to position the build material granules 16 between the build material distributor 18 and the build area platform 12. In some examples, the build material supply 14 may include a surface upon which the build material granules 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material granules 16 from a storage location to a position to be spread onto the build area platform 12 or onto a previously formed layer of build material granules 16.

The build material distributor 18 may be moved in a direction as denoted by the arrow 22, e.g., along the y-axis, over the build material supply 14 and across the build area platform 12 to spread a layer of the build material granules 16 over the build area platform 12. The build material distributor 18 may also be returned to a position adjacent to the build material supply 14 following the spreading of the build material granules 16. The build material distributor 18 may be a blade (e.g., a doctor blade), a roller, a combination of a roller and a blade, and/or any other device capable of spreading the build material granules 16 over the build area platform 12. For instance, the build material distributor 18 may be a counter-rotating roller.

Figure 2:
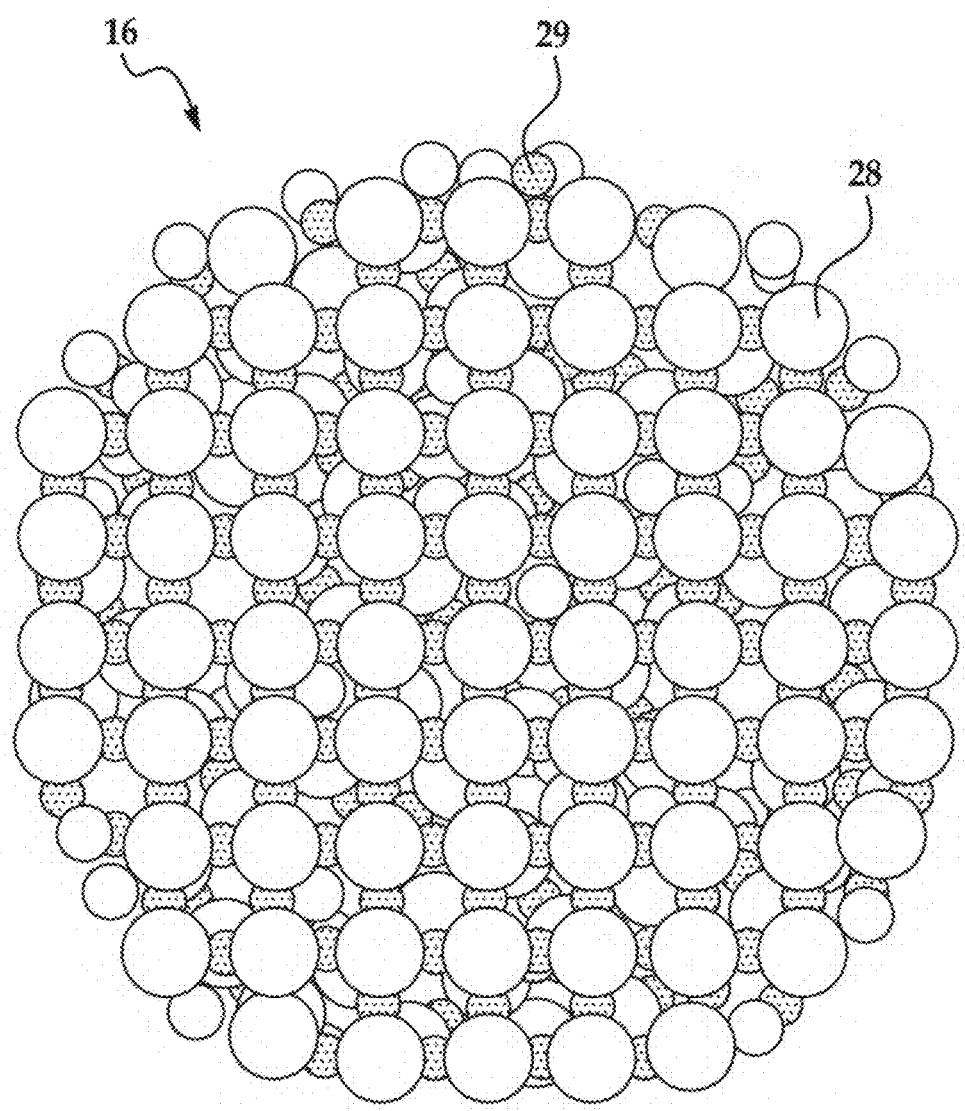
FIG. 2 is a schematic representation of an example of the metallic build material granule disclosed herein.

Referring briefly to FIG. 2, an example of a metallic build material granule 16 is shown. Each metallic build material granule 16 includes a plurality of primary metal particles 28 having a primary metal particle size ranging from about 1 µm to about 20 µm or from ≤1 µm to about 15 µm, wherein the primary metal particles are non-shape memory metal particles and wherein the metallic build material granule 16 excludes shape memory metal particles, and a temporary binder 29 agglomerating the plurality of primary metal particles together. In some examples, the build material granules 16 consist of the primary metal particles 28 and the temporary binder 29 with no other components. In some other examples, the build material granules 16 consist of the primary metal particles 28, the temporary binder 29, and a surfactant/wetting agent with no other components.

In an example, the build material granules 16 have an average granule size ranging from about 10 µm to about 200 µm. In another example, the average granule size ranges from about 20 µm to about 150 µm. The term "average granule size" is used herein to describe the granule build material 16. The average granule size generally refers to the diameter or average diameter of the granule build material 16, which may vary, depending upon the morphology of the granule. In an example, a respective build material granule 16 may have a morphology that is substantially spherical. A substantially spherical granule 16 (i.e., spherical or near-spherical) has a sphericity of >0.84. Thus, any individual granules 16 having a sphericity of <0.84 are considered non-spherical (irregularly shaped). The granule size of the substantially spherical granule 16 may be provided by its largest diameter, and the granule size of a non-spherical granule 16 may be provided by its average diameter (i.e., the average of multiple dimensions across the granule 16) or by an effective diameter, which is the diameter of a sphere with the same mass and density as the non-spherical granule 16. In an example, each of the build material granules 16 is substantially spherical.

In some examples, the metallic build material granules 16 have a hollow center as shown in FIGS. 3A through 3E. In other examples, the metallic build material granules 16 have a substantially filled in center as shown in FIG. 2.

The primary metal particles 28 may be any particulate, non-shape memory metallic material. As used herein, "non-shape memory" means i) that the individual primary metal particles 28 and/or the combination of the primary metal particles 28 (e.g., when multiple primary metal particles 28 of the same type or of different types are used in each build material granule 16) do not exhibit shape memory properties, and ii) that the individual primary metal particles 28 and the combination of primary metal particles 28 are not an alloy and/or do not form an alloy that would be capable of acquiring shape memory properties (e.g., after being subject to a particular thermo-mechanical treatment). In other words, the individual primary metal particles 28 and the combination of primary metal particles 28 are not alloys with ratios of metal elements that are capable acquiring shape memory properties, and are not present in ratios capable of forming alloys that are capable acquiring shape memory properties. It is to be understood that the single metal elements and the alloys described for the primary metal particles 28 are non-shape memory, even if the term is not explicitly used.

In an example, the primary metal particles 28 may be a powder. In another example, the primary metal particles 28 may have the ability to sinter into a continuous body to form the metallic part 52 (see, e.g., FIG. 3F) when heated to the sintering temperature (e.g., a temperature ranging from about 600° C. to about 1800° C.). By "continuous body," it is meant that the primary metal particles 28 are merged together to form a single part with little or no porosity and with sufficient mechanical strength to meet the requirements of the desired, final metallic part 52.

While an example sintering temperature range is provided, it is to be understood that this temperature may vary, depending, in part, upon the composition and phase(s) of the primary metal particles 28.

In an example, the primary metal particles 28 are a single phase metallic material composed of one element. In this example, the sintering temperature may be below the melting point of the single element.

In another example, the primary metal particles 28 are composed of two or more elements, which may be in the form of a single phase metallic, non-shape memory alloy or a multiple phase metallic, non-shape memory alloy. In these other examples, melting generally occurs over a range of temperatures. For some single phase metallic alloys, melting begins just above the solidus temperature (where melting is initiated) and is not complete until the liquidus temperature (temperature at which all the solid has melted) is exceeded. For other single phase metallic alloys, melting begins just above the peritectic temperature. The peritectic temperature is defined by the point where a single phase solid transforms into a two phase solid plus liquid mixture, where the solid above the peritectic temperature is of a different phase than the solid below the peritectic temperature. When the primary metal particles 28 are composed of two or more phases (e.g., a multiphase alloy made of two or more elements), melting generally begins when the eutectic or peritectic temperature is exceeded. The eutectic temperature is defined by the temperature at which a single phase liquid completely solidifies into a two phase solid. Generally, melting of the single phase metallic alloy or the multiple phase metallic alloy begins just above the solidus, eutectic, or peritectic temperature and is not complete until the liquidus temperature is exceeded. In some examples, sintering can occur below the solidus temperature, the peritectic temperature, or the eutectic temperature. In other examples, sintering occurs above the solidus temperature, the peritectic temperature, or the eutectic temperature. Sintering above the solidus temperature is known as super solidus sintering, and this technique may be desirable when using larger primary metal particles 28 and/or to achieve high density. In an example, the composition of the primary metal particles 28 may be selected so that at least 40 vol % of the primary metal particles 28 are made up of phase(s) that have a melting point above the desired sintering temperature. It is to be understood that the sintering temperature may be high enough to provide sufficient energy to allow atom mobility between adjacent particles 28.

The primary metal particles 28 may be composed of a single metal element (e.g., iron (Fe), copper (Cu), silver (Ag), gold (Au), platinum (Pt), etc.), or the primary metal particles 28 may be composed of a multiple metal elements. When the primary metal particles 28 are composed of a multiple metal elements, each primary metal particle 28 may be a non-shape memory alloy. In some individual granule 16, the primary metal particles 28 may be formed of the same alloy or of different alloys. In other individual granules 16, the primary metal particles 28 may be formed of multiple single metal elements or a combination of single elements and alloys. In some examples, multiple granules 16 may be used, where different granules 16 contain different primary metal particles 28 (e.g., single metal elements and/or non-shape memory alloys). When a combination of different primary metal particles 28 is used (either within each of the build material granules 16 or among different build material granules 16), the different primary metal particles 28 may sinter together when heated to the sintering temperature to form a single alloy throughout the metallic part 52. Additionally, when a combination of different primary metal particles 28 is used (either within each of the build material granules 16 or among different build material granules 16), the different primary metal particles 28 may be selected to have similar melting temperature and/or so that a sintering temperature that does not deleteriously affect the structure/composition of the final 3D part 52 may be selected.

Some examples of the primary metal particles 28 include steels, stainless steel, bronzes, titanium (Ti) and non-shape memory alloys thereof, aluminum (Al) and non-shape memory alloys thereof, tungsten (W) and non-shape memory alloys thereof, molybdenum (Mo) and non-shape memory alloys thereof, nickel (Ni) and non-shape memory alloys thereof, cobalt (Co) and non-shape memory alloys thereof, iron (Fe) and non-shape memory alloys thereof, nickel cobalt (NiCo) non-shape memory alloys, gold (Au) and non-shape memory alloys thereof, silver (Ag) and non-shape memory alloys thereof, platinum (Pt) and non-shape memory alloys thereof, and copper (Cu) and non-shape memory alloys thereof. Some specific examples include AlSi10Mg, 2xxx series aluminum, 4xxx series aluminum, CoCr MP1, CoCr SP2, Maraging Steel MS1, Hastelloy C, Hastelloy X, Nickel Alloy HX, Inconel 1N625, SS GP1, SS 17-4PH, SS 316L, Ti6Al4V, and Ti-6Al-4V ELI7. While several example alloys have been provided, it is to be understood that other non-shape memory alloy build materials may be used, such as PbSn soldering alloys. As mentioned above, the primary metal particles 28, individually or in combination with each other, do not form an alloy capable of acquiring shape memory properties. An example of an alloy that is capable of acquiring shape memory properties (and thus would not be used as the primary metal particle 28) is a nickel-titanium alloy containing from about 55 wt % to about 60 wt % of nickel. In an example, the primary metal particles 28 are non-shape memory, metal particles selected from the group consisting of iron, steel, stainless steel, copper, bronze, aluminum, tungsten, molybdenum, silver, gold, platinum, titanium, nickel, cobalt, non-shape memory alloys of any of these metals, and combinations thereof.

Any non-shape memory, metal particles in powder form at the outset of the 3D printing method(s) disclosed herein may be used as the primary metal particles 28. As such, the melting point, solidus temperature, eutectic temperature, and/or peritectic temperature of the primary metal particle 28 may be above the temperature of the environment in which the patterning portion of the 3D printing method is performed (e.g., above 40° C.). In some examples, the primary metal particles 28 may have a melting point ranging from about 850° C. to about 3500° C. In other examples, the primary metal particles 28 may be an alloy or a combination of single element(s) and/or alloy(s) having a range of melting points. Alloys may include metals with melting points as low as −39° C. (e.g., mercury), or 30° C. (e.g., gallium), or 157° C. (indium), etc.

In an example, the particle size of the primary metal particles 28 ranges from 1 μm to about 20 μm. In another example, the primary metal particle size ranges from 10 μm to about 15 μm. In still another example, the primary metal particle size ranges from 2 μm to about 5 μm. The particle size of the primary metal particles 28 generally refers to the diameter or average diameter of the metal particle, which may vary, depending upon the morphology of the particle. In an example, a respective primary metal particle may have a morphology that is substantially spherical A substantially spherical particle (i.e., spherical or near-spherical) has a sphericity of >0.84. Thus, any individual particles having a sphericity of <0.84 are considered non-spherical (irregularly shaped). The particle size of the substantially spherical primary metal particle may be provided by its largest diameter, and the particle size of a non-spherical primary metal particle may be provided by its average diameter (i.e., the average of multiple dimensions across the particle) or by an effective diameter, which is the diameter of a sphere with the same mass and density as the non-spherical particle.

The primary metal particles 28 may be similarly sized particles or differently sized particles. In the example shown in FIG. 3A, the primary metal particles 28 are similarly sized particles.

The temporary binder 29 may be any material that i) has enough adhesive strength to hold the primary metal particles 28 together to form the granules 16 with enough mechanical stability to survive limited handling (e.g., spreading the build material granules 16 into layers), and ii) is at least partially soluble in the patterning fluid 26 such that the granules 16 are converted into a slurry of the primary metal particles 28.

One key property of the temporary binder 29 is its solubility in the patterning fluid 26. The temporary binder solubility in the patterning fluid 26 should be higher than 0.5 wt %, when measured at a temperature corresponding to that of the printing environment. In some examples, the temporary binder solubility is higher than 2 wt %. In some other examples, the temporary binder has a solubility high enough that it may be fully dissolved in the amount of patterning fluid 26 that is jetted thereon. It is to be understood that there is no upper limit on the temporary binder solubility in the patterning fluid 26, and the higher the solubility, the better.

The temporary binder 29 may be a small molecular species or a short chain polymer that meets the criteria i and ii. Examples of suitable temporary binders 29 include polyacrylates, sugars, sugar alcohols, polymeric or oligomeric sugars, polycarboxylic acids, polysulfonic acids, water soluble polymers containing carboxylic or sulfonic moieties, polyvinyl alcohol, polyethers, polyvinylpyrrolidone, polyether alkoxy silane, and combinations thereof. Some specific examples include glucose ($C_6H_{12}O_6$), sucrose ($C_{12}H_{22}O_{11}$), fructose ($C_6H_{12}O_6$), maltodextrines with a chain length ranging from 2 units to 20 units, sorbitol ($C_6H_{14}O_6$), erythritol ($C_4H_{10}O_4$), mannitol ($C_6H_{14}O_6$), polyethylene glycol and/or a co-polymer thereof, polypropylene glycol and/or a co-polymer thereof, or CARBOSPERSE® K7028 (a short chain polyacrylic acid, M~2,300 Da, available from Lubrizol). Low or moderate molecular weight polycarboxylic acids (e.g., having a molecular weight less than 5,000 Da) may dissolve relatively fast. It is to be understood that higher molecular weight polycarboxylic acids (e.g., having a molecular weight greater than 5,000 Da up to 10,000 Da) may be used, however the dissolution kinetics may be slower. In an example, the temporary binder is selected from the group consisting of polyacrylates, sugars, sugar alcohols, polymeric or oligomeric sugars, polycarboxylic acids, polysulfonic acids, water soluble polymers containing carboxylic or sulfonic moieties, polyethers, polyvinylpyrrolidone, polyether alkoxy silane, and combinations thereof. In another example, the temporary binder 29 is a polyacrylate.

In an example, the temporary binder 29 is present in each granule 16 in an amount ranging from about 0.01 wt % to about 4.0 wt % based on the wt % of the primary metal particles 28 in each granule 16. In another example, the temporary binder 29 is present in each granule 16 in an amount ranging from about 0.05 wt % to about 2 wt % based on the wt % of the primary metal particles 28 in each granule 16.

As mentioned above, in some examples, the build material granules consist of the primary metal particles 28 and the temporary binder 29 alone with no other components. As an example, the temporary binder 29 is selected from the group consisting of polyacrylates, sugars, sugar alcohols, polymeric or oligomeric sugars, polycarboxylic acids, polysulfonic acids, water soluble polymers containing carboxylic or sulfonic moieties, polyethers, polyvinylpyrrolidone, polyether alkoxy silane, and combinations thereof; and the primary metal particles are non-shape memory metal particles selected from the group consisting of iron, stainless steel, steel, copper, bronze, aluminum, tungsten, molybdenum, silver, gold, platinum, titanium, nickel, cobalt, non-shape memory alloys of any of these metals, and combinations thereof.

In other examples, the build material granules consist of the primary metal particles 28, the temporary binder 29, and the surfactant(s)/wetting agent(s).

Surfactant(s)/wetting agent(s) may be included in the build material granules 16 to facilitate wetting of the granules 16 by the patterning fluid 26 and to accelerate the disintegration of the granules 16 into the slurry of primary metal particles 28. Surfactant(s)/wetting agent(s) may also act as dispersing aids in the granulation formation process (i.e., surfactant(s) may disperse the primary metal particles 28 in a mixture containing the temporary binder 29 prior to the spray drying or the freeze spraying with subsequent freeze-drying of the mixture). A wide variety of surfactants/wetting agents can be used in the build material granules 16, including non-ionic, cationic, and anionic surfactants. Examples of suitable surfactants/wetting agents include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In a specific example, the surfactant is a non-ionic, ethoxylated acetylenic diol (e.g., SURFYNOL® 465 from Air Products and Chemical Inc.). In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOLO® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

When the surfactant(s)/wetting agent(s) is/are included in the build material granules, the surfactant(s)/wetting agent(s) may be present in an amount ranging from about 0.01 wt % to about 2 wt % based on the total wt % of the primary metal particles 28. In an example, the surfactant(s)/wetting agent(s) are present in an amount ranging from about 0.02 wt % to about 1.0 wt. %.

The granules 16 may be produced via any suitable method, such as spray drying, freeze spraying with subsequent freeze-drying, or any other suitable wet granulation technology.

In some examples, each of the build material granules 16 has a granule size ranging from about 10 µm to about 200 µm; and each of the primary metal particles 28 has a particle size ranging from about 1 µm to 20 µm.

In some specific granule 16 examples, the temporary binder 29 is selected from the group consisting of polyacrylates, sugars, sugar alcohols, polymeric or oligomeric sugars, polycarboxylic acids, polysulfonic acids, water soluble polymers containing carboxylic or sulfonic moieties, polyethers, polyvinylpyrrolidone, polyether alkoxy silane, and combinations thereof; the primary metal particles 28 are non-shape memory metal particles selected from the group consisting of iron, stainless steel, steel, copper, bronze, aluminum, tungsten, molybdenum, silver, gold, platinum, titanium, nickel, cobalt, non-shape memory alloys of any of these metals, and combinations thereof; and the temporary binder 29 is present in an amount ranging from about 0.01 wt % to about 4.0 wt % based on a wt % of the primary metal particles 28.

In the examples disclosed herein, the build material may consist of the build material granules 16 alone with no other components.

Referring back to FIG. 1, the printing system 10 also includes an applicator 24, which may contain the patterning fluid 26 disclosed herein.

The patterning fluid 26 is capable of at least partially dissolving the temporary binder 29 in the build material granules 16. In some examples, the patterning fluid 26 is capable of fully dissolving the temporary binder 29. The patterning fluid 26 is also relatively volatile such that it can be evaporated during the printing process.

The patterning fluid 26 may be selected, at least in part, based on the temporary binder 29 used. In some examples, the patterning fluid 26 may include water. In an example, the patterning fluid 26 consists of water (with no other components). When the patterning fluid 26 includes water as the primary or only component, the temporary binder 29 is water soluble.

In other examples, the patterning fluid 26 may be (or include) a non-aqueous solvent. The non-aqueous solvent may be included in the patterning fluid 26 when the temporary binder 29 is a non-polar material. The non-aqueous solvent may be a non-polar or medium polar primary solvent, such as ethanol, acetone, n-methyl pyrrolidone, and/or aliphatic hydrocarbons.

In still another example, the patterning fluid 26 includes ethyl acetate or other relatively volatile solvents (i.e., solvents able to at least substantially evaporate during the printing process).

In some examples, the patterning fluid 26 may include a radiation absorber to increase the rate at which the densification/evaporation temperature, the thermal decomposition temperature, and/or the sintering temperature is/are reached. In these examples, the radiation absorber may be any infrared light absorbing colorant that does not deleteriously affect the desired properties of the metallic 3D part and does not weaken the sintered metal structure. In some instances, it may be desirable that the patterning fluid 26 does not include any radiation absorber, especially if the primary metal particles are IR absorbing. In an example, the patterning fluid 26 may include metal nanoparticles as the radiation absorber.

When the radiation absorber is included in the patterning fluid 26, the radiation absorber may be present in an amount ranging from about 0.1 wt % to about 20 wt % based on the total wt % of the patterning fluid 26.

In some examples, the patterning fluid 26 may also include co-solvent(s), surfactant(s), antimicrobial agent(s), and/or anti-kogation agent(s).

Examples of suitable co-solvents include 2-pyrrolidinone, N-methylpyrrolidone, 1-(2-hydroxyethyl)-2-pyrrolidinone, 1,6-hexanediol or other diols (e.g., 1,5-pentanediol, 2-methyl-1,3-propanediol, etc.), triethylene glycol, tetraethylene glycol, tripropylene glycol methyl ether, or the like, or combinations thereof.

Whether used alone or in combination, the total amount of the co-solvent(s) ranges from about 1 wt % to about 80 wt % of the total wt % of the patterning fluid 26.

Surfactant(s) may be used to improve the wetting properties and the jettability of the patterning fluid 26. Examples of suitable surfactants include any of the surfactants listed above in reference to the build material granules 16.

Whether a single surfactant is used or a combination of surfactants is used, the total amount of surfactant(s) in the patterning fluid 26 may range from about 0.1 wt % to about 4 wt % based on the total wt % of the patterning fluid 26.

The patterning fluid 26 may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof.

In an example, the patterning fluid 26 may include a total amount of antimicrobial agents that ranges from about 0.1 wt % to about 1 wt %. In an example, the antimicrobial agent is a biocide and is present in the patterning fluid 26 in an amount of about 0.32 wt % (based on the total wt % of the patterning fluid 26). In another example, the antimicrobial agent is a biocide and is present in the patterning fluid 26 in an amount of about 0.128 wt % (based on the total wt % of the patterning fluid 26).

An anti-kogation agent may be included in the patterning fluid 26. Kogation refers to the deposit of dried ink (e.g., patterning fluid 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the patterning fluid 26 may range from about 0.1 wt % to about 5 wt % based on the total wt % of the pattering fluid 26.

The applicator 24 may be scanned across the build area platform 12 in the direction indicated by the arrow 30, e.g., along the y-axis. The applicator 24 may be, for instance, an inkjet applicator, such as a thermal inkjet printhead, a piezoelectric printhead, etc., and may extend a width of the build area platform 12. While the applicator 24 is shown in FIG. 1 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the patterning fluid 26 over a large area of a layer of the build material granules 16. The applicator 24 may thus be attached to a moving XY stage or a translational carriage (neither of which is shown) that moves the applicator 24 adjacent to the build area platform 12 in order to deposit the patterning fluid 26 in predetermined areas of a layer of the build material granules 16 that has been formed on the build area platform 12 in accordance with the method(s) disclosed herein. The applicator 24 may include a plurality of nozzles (not shown) through which the patterning fluid 26 is to be ejected.

The applicator 24 may deliver drops of the patterning fluid 26 at a resolution ranging from about 300 dots per inch (DPI) to about 1200 DPI. In other examples, the applicator 24 may deliver drops of the patterning fluid 26 at a higher or lower resolution. The drop velocity may range from about 2 m/s to about 24 m/s and the firing frequency may range from about 1 kHz to about 100 kHz. In one example, each drop may be in the order of about 10 picoliters (pl) per drop, although it is contemplated that a higher or lower drop size may be used. For example, the drop size may range from about 1 pl to about 400 pl. In some examples, applicator 24 is able to deliver variable size drops of the patterning fluid 26.

Each of the previously described physical elements may be operatively connected to a controller 32 of the printing system 10. The controller 32 may process print data that is based on a 3D object model of the 3D object/part to be generated. In response to data processing, the controller 32 may control the operations of the build area platform 12, the build material supply 14, the build material distributor 18, and the applicator 24. As an example, the controller 32 may control actuators (not shown) to control various operations of the 3D printing system 10 components. The controller 32 may be a computing device, a semiconductor-based microprocessor, a central processing unit (CPU), an application specific integrated circuit (ASIC), and/or another hardware device. Although not shown, the controller 32 may be connected to the 3D printing system 10 components via communication lines.

The controller 32 manipulates and transforms data, which may be represented as physical (electronic) quantities within the printer's registers and memories, in order to control the physical elements to create the 3D part 52. As such, the controller 32 is depicted as being in communication with a data store 34. The data store 34 may include data pertaining to a 3D part 52 to be printed by the 3D printing system 10. The data for the selective delivery of the build material granules 16, the patterning fluid 26, etc. may be derived from a model of the 3D part 52 to be formed. For instance, the data may include the locations on each layer of build material granules 16 that the applicator 24 is to deposit the patterning fluid 26. In one example, the controller 32 may use the data to control the applicator 24 to selectively apply the patterning fluid 26. The data store 34 may also include machine readable instructions (stored on a non-transitory computer readable medium) that are to cause the controller 32 to control the amount of build material granules 16 that is supplied by the build material supply 14, the movement of the build area platform 12, the movement of the build material distributor 18, the movement of the applicator 24, etc.

As shown in FIG. 1, the printing system 10 may also include a heat source 36, 36'. In some examples, the heat source 36 includes a conventional furnace or oven, a microwave, or devices capable of hybrid heating (i.e., conventional heating and microwave heating). This type of heat source 36 may be used for heating the entire build material cake 46 (see FIG. 3E) after the printing is finished or for heating the densified green part 44' or for heating the at least substantially binder-free gray part 50 after the densified green part 44' is removed from the build material cake 46 (see FIG. 3F). In some examples, patterning may take place in the printing system 10, and then the build material platform 12 with the patterned green part 44 thereon may be detached from the system 10 and placed into the heat source 36 for the various heating stages. In other examples, the heat source 36 may be a conductive heater or a radiative heater (e.g., infrared lamps) that is integrated into the system 10. These other types of heat sources 36 may be placed below the build area platform 12 (e.g., conductive heating from below the platform 12) or may be placed above the build area platform 12 (e.g., radiative heating of the build material layer surface). Combinations of these types of heating may also be used. These other types of heat sources 36 may be used throughout the 3D printing process. In still other examples, the heat source 36' may be a radiative heat source (e.g., a curing lamp) that is positioned to heat each layer 38 (see FIG. 3C) after the patterning fluid 26 has been applied thereto. In the example shown in FIG. 1, the heat source 36' is attached to the side of the applicator 24, which allows for printing and heating in a single pass. In some examples, both the heat source 36 and the heat source 36' may be used.

Referring now to FIGS. 3A through 3F, an example of the 3D printing method is depicted. Prior to execution of the method 100 or as part of the method 100, the controller 32 may access data stored in the data store 34 pertaining to a 3D part 52 that is to be printed. The controller 32 may determine the number of layers of build material granules 16 that are to be formed, and the locations at which patterning fluid 26 from the applicator 24 is to be deposited on each of the respective layers.

As shown in FIGS. 3A and 3B, the method 100 includes applying the build material granules 16. In FIG. 3A, the build material supply 14 may supply the build material granules 16 into a position so that they are ready to be spread onto the build area platform 12. In FIG. 3B, the build material distributor 18 may spread the supplied build material granules 16 onto the build area platform 12. The controller 32 (not shown in FIG. 3B) may process control build material supply data, and in response control the build material supply 14 to appropriately position the build material granules 16, and may process control spreader data, and in response control the build material distributor 18 to spread the supplied build material granules 16 over the build area platform 12 to form a layer 38 of build material granules 16 thereon. As shown in FIG. 3B, one layer 38 of the build material granules 16 has been applied.

The layer 38 has a substantially uniform thickness across the build area platform 12. In an example, the thickness of the layer 38 ranges from about 30 μm to about 300 μm, although thinner or thicker layers may also be used. For example, the thickness of the layer 38 may range from about 20 μm to about 500 μm. The layer thickness may be about 2× the granule diameter at a minimum for finer part definition. In some examples, the layer thickness may be about 1.2× (i.e., 1.2 times) the granule diameter.

While not shown in FIGS. 3A through 3F, the method 100 may include preparing the build material granules 16 prior to applying the build material granules 16. In an example, preparing the build material granules 16 may include dispersing the primary metal particles 28 in a mixture containing the temporary binder 29; and spray drying the mixture containing the primary metal particles 28 dispersed therein to create the build material granules 16. In these examples, a slurry may be produced. The slurry (containing the temporary binder 29 and the primary metal particles 28) may then be converted into dry granular powder by spray drying or freeze spraying with subsequent freeze-drying the slurry containing the temporary binder 29 and the primary metal particles 28. The spray drying or freeze spraying with subsequent freeze-drying forms/creates the build material granules 16. In some examples, the surfactant(s)/wetting agent(s) may also be included in the mixture/slurry that is converted into dry granular powder by spray drying or freeze spraying with subsequent freeze-drying. Other suitable wet granulation technology may also be used to covert the slurry or the mixture containing the temporary binder 29 and the primary metal particles 28 (and optionally the surfactant(s)/wetting agent(s)) into dry granular powder.

Referring now to FIG. 3C, the method 100 continues by selectively applying the patterning fluid 26 on a portion 40 of the build material granules 16. As illustrated in FIG. 3C, the patterning fluid 26 may be dispensed from the applicator 24. The applicator 24 may be a thermal inkjet printhead, a piezoelectric printhead, etc., and the selectively applying of the patterning fluid 26 may be accomplished by the associated inkjet printing technique. As such, the selectively applying of the patterning fluid 26 may be accomplished by thermal inkjet printing or piezo electric inkjet printing.

The controller 32 may process data, and in response, control the applicator 24 (e.g., in the directions indicated by the arrow 30) to deposit the patterning fluid 26 onto predetermined portion(s) 40 of the build material granules 16 that are to become part of a patterned green part 44 and are to ultimately be sintered to form the 3D part 52. The applicator 24 may be programmed to receive commands from the controller 32 and to deposit the patterning fluid 26 according to a pattern of a cross-section for the layer of the 3D part 52 that is to be formed. As used herein, the cross-section of the layer of the 3D part 52 to be formed refers to the cross-section that is parallel to the surface of the build area platform 12. In the example shown in FIG. 3C, the applicator 24 selectively applies the patterning fluid 26 on those portion(s) 40 of the layer 38 that are to become the first layer of the 3D part 52. As an example, if the 3D part that is to be formed is to be shaped like a cube or cylinder, the patterning fluid 26 will be deposited in a square pattern or a circular pattern (from a top view), respectively, on at least a portion of the layer 38 of the build material granules 16. In the example shown in FIG. 3C, the patterning fluid 26 is deposited in a square pattern on the portion 40 of the layer 38 and not on the portions 42.

As mentioned above, the patterning fluid 26 is capable of at least partially dissolving the temporary binder 29 in the build material granules 16 and is also relatively volatile so that it can be evaporated later during the printing process.

Since the temporary binder 29 is at least partially soluble in the patterning fluid 26, the selective application of the patterning fluid 26 dissolves the temporary binder 29. When the patterning fluid 26 is selectively applied in the desired portion(s) 40, the patterning fluid 26 penetrates into the layer 38 and the temporary binder 29 of the build material granules 16 in contact with the patterning fluid 26 at least partially dissolves. At least partial dissolution of the temporary binder 29 weakens the build material granules 16, and forms a slurry of the primary metal particles 28.

The volume of the patterning fluid 26 that is applied per unit of build material or granules 16 in the patterned portion 40 may be sufficient to cause slurry formation, which can lead to densification of the primary metal particles 28 within the portion 40 of the layer 38 upon evaporation of the patterning fluid 26.

It is to be understood that in portions 42 of the build material granules 16 that do not have the patterning fluid 26 applied thereto, the temporary binder 29 of the granules 16 does not dissolve, a slurry of the primary metal particles 28 in these portions 42 does not form, and the primary metal particles 28 in these portions 42 do not densify upon evaporation of the patterning fluid 26. As such, these portions 42 do not become part of the patterned green part 44, the densified green part 44', the at least substantially binder-free gray part 50, or the metallic part 52 that is ultimately formed.

The method 100 may continue by at least substantially evaporating the patterning fluid 26. It is to be understood that at least substantial evaporation of the patterning fluid 26 may be partial evaporation or complete evaporation. At least substantial evaporation of the patterning fluid 26 may be partial evaporation when the presence of residual patterning fluid 26 does not deleteriously affect the desired structural integrity of the metallic part 52. In these examples, the densified green part 44' formed by the at least substantial evaporation of the patterning fluid 26 may contain residual amount of the patterning fluid 26, but the patterning fluid 26 is completely removed during de-binding. The (partial or complete) evaporating of the patterning fluid 26 causes densification of the plurality of primary metal particles 28 in the at least the portion 40 of the build material granules 16 and forms a layer of the densified green part 44'. The densification of the plurality of primary metal particles 28 may be due to capillary compaction.

Evaporation of the patterning fluid 26 may take place after a patterned green part 44 (see FIG. 3E) has been formed, or as each layer of the patterned green part 44 is formed. Each of these examples will now be described.

The processes shown in FIGS. 3A through 3C may be repeated to iteratively build up several patterned layers and to form the patterned green part 44. FIG. 3D illustrates the initial formation of a second layer of build material granules 16 on the layer 38 patterned with the patterning fluid 26. In FIG. 3D, following deposition of the patterning fluid 26 onto predetermined portion(s) 40 of the layer 38 of build material granules 16, the controller 32 may process data, and in response cause the build area platform 12 to be moved a relatively small distance in the direction denoted by the arrow 20. In other words, the build area platform 12 may be lowered to enable the next layer of build material granules 16 to be formed. For example, the build material platform 12 may be lowered a distance that is equivalent to the height of the layer 38. In addition, following the lowering of the build area platform 12, the controller 32 may control the build material supply 14 to supply additional build material granules 16 (e.g., through operation of an elevator, an auger, or the like) and the build material distributor 18 to form another layer of build material granules 16 on top of the previously formed layer 38 with the additional build material granules 16. The newly formed layer may be patterned with patterning fluid 26.

Figure 3E:
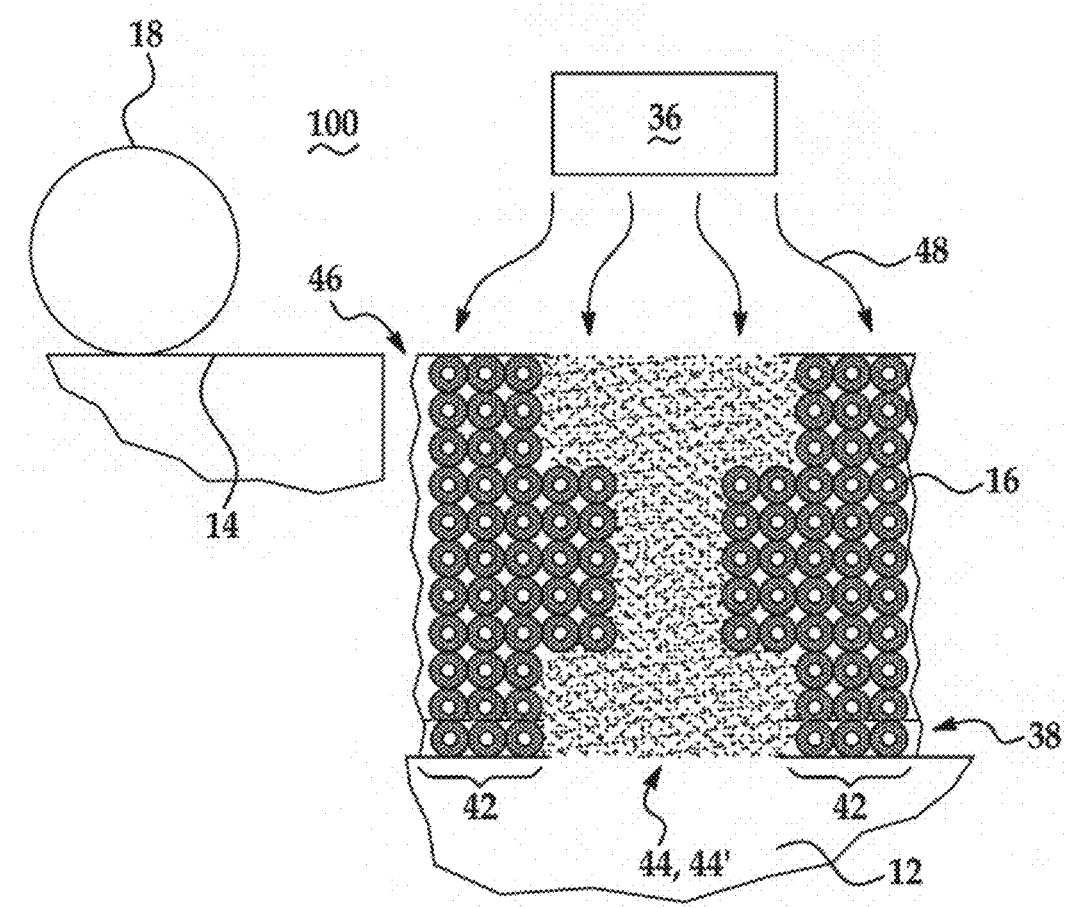

Repeatedly forming and patterning new layers results in the formation of a build material cake 46, as shown in FIG. 3E, which includes the patterned green part 44 residing within the non-patterned portions 42 of each of the layers 38 of build material granules 16. The patterned green part 44 is a volume of the build material cake 46 that is filled with a structurally homogeneous slurry, containing the patterning fluid 26, dissolved temporary binder 29, and the primary metal particles 28, that has been converted from the patterned granules 16. The remainder of the build material cake 46 is made up of the non-patterned (original, i.e., non-dissolved) build material granules 16.

The temperature of the environment in which the 3D printing method is performed (e.g., the temperature of the build area platform 12 during the forming and patterning of new layers) is about 5° C. to about 50° C. below the boiling point of the patterning fluid 26 (or the primary solvent of the patterning fluid 26). In an example, the temperature of the build area platform 12 during the forming and patterning of new layers ranges from about 50° C. to about 95° C. Other examples of the 3D printing environment temperature may range from about 40° C. to about 50° C.

Also as shown in FIG. 3E, the build material cake 46 may be exposed to heat or radiation to generate heat, as denoted by the arrows 48. The heat applied may be sufficient to evaporate the patterning fluid 26 from the patterned green part 44, and to produce to the densified green part 44'. In one example, the heat source 36 may be used to apply the heat to the build material cake 46. In the example shown in FIG. 3E, the build material cake 46 may remain on the build area platform 12 while being heated by the heat source 36. In another example, the build area platform 12, with the build material cake 46 thereon, may be detached from the applicator 24 and placed in the heat source 36. Any of the previously described heat sources 36 and/or 36' may be used.

Referring back to FIG. 3C, in another example of the method 100, the layer 38 may be exposed to heating using heat source 36 (e.g., integrated into the build material platform 12) or heat source 36' after the patterning fluid 26 is applied to the layer 38 and before another layer is formed. The heat source 36, 36' may be used to evaporate the patterning fluid 26 during printing layer-by-layer, and for producing a stabilized and densified green part layer.

In a layer-by-layer example, the applying of the build material granules 16, the selectively applying of the patterning fluid 26, and the at least substantially evaporating of the patterning fluid 26 are each accomplished on the build area platform 12. Then the method includes repeating the applying of the build material granules 16, the selectively applying of the patterning fluid 26, and the evaporating of the patterning fluid 26 to iteratively form multiple layers of the densified green part 44'.

Heating to form the densified green part layer may take place at a temperature that is capable of evaporating the patterning fluid 26, but that is not capable of thermally decomposing the temporary binder 29 or sintering the primary metal particles 28. Examples of suitable densification/evaporation temperatures are provided below. In this example, the processes shown in FIGS. 3A through 3C (including the heating of the layer 38) may be repeated to iteratively build up several densified layers and to produce the densified green part 44'. When the layers are heated separately, the layers are able to merge together due to the patterning fluid 26 penetrating through the current layer to the underlying layer, which may redissolve the temporary binder 29 in the underlying layer and allow the current layer and the underlying layer to be bound by the temporary binder 29 upon the evaporation of the patterning fluid 26. Penetration may occur faster than evaporation, and thus the patterning fluid 26 may also carry dissolved temporary binder 26 with it when it penetrates an underlying layer, which may help to bind adjacent layers together. The densified green part 44' can then be exposed to the processes described in reference to FIG. 3F.

Heating to form the densified green part 44' may take place at a temperature and for a time period that is capable of at least partially evaporating the patterning fluid 26, which may cause the patterned green part 44 (or a patterned green part layer) to densified due to capillary compaction and form the densified green part 44' (or a densified green part layer). In an example, the densification/evaporation temperature may be above ambient temperature. As used therein, "ambient temperature" may refer to room temperature (e.g., ranging about 18° C. to about 22° C.), or to the temperature of the environment in which the 3D printing method is performed (e.g., the temperature of the build area platform 12 during the forming and patterning of new layers). In another example, the densification/evaporation temperature is below a temperature at which the temporary binder 29 would be damaged (i.e., be unable to bind the densified green part 44'). For a majority of suitable temporary binders 29, the upper limit of the densification/evaporation temperature ranges from about 180° C. to about 220° C. Above this temperature threshold, the temporary binder 29 would chemically degrade into volatile species and leave the patterned green part 44, and thus would stop performing their function. For a majority of patterning fluids 26, the densification/evaporation temperature ranges from about 50° C. to about 220° C. As another example, the densification/evaporation temperature may range from about 10° C. to about 100° C. As still another example, the densification/evaporation temperature may range from about 70° C. to about 90° C.

The densification/evaporation time may depend, in part, on the densification/evaporation temperature and/or the patterning fluid 26 used. For example, a higher densification/evaporation temperature and/or a more volatile patterning fluid 26 may result in a shorter densification/evaporation time period, and a lower densification/evaporation temperature and/or a less volatile patterning fluid 26 may result in a longer densification/evaporation time period. Evaporation, and thus densification, may vary, depending upon the temperature, humidity, and/or air circulation. For a majority of patterning fluids 26, the densification/evaporation time period ranges from about 1 second to about 1 minute per layer. In an example, the densification/evaporation time period is about 15 seconds.

The patterned green part 44 may be heated to the densification/evaporation temperature at a rate of about 1° C./minute to about 10° C./minute, although it is contemplated that a slower or faster heating rate may be used. The heating rate may depend, in part, on one or more of the patterning fluid 26 used, the size (i.e., thickness and/or area (across the x-y plane)) of the layer 38, and/or the characteristics of the 3D part 52 (e.g., size, wall thickness, etc.). In an example, patterned green part 44 is heated to the densification/evaporation temperature at a rate of about 2.25° C./minute.

In some examples of the method 100, the patterning fluid 26 may be allowed to evaporate without heating. For example, more volatile solvents (e.g., acetone) can evaporate in seconds at room temperature. In these examples, build material cake 46 or individual patterned layer is not exposed to heat or radiation to generate heat, and the patterning fluid 26 evaporates over time. In an example, the patterning fluid 26 may evaporate without heating within a time period ranging from about 1 second to about 1 minute.

At least substantially evaporating (with or without heating) the patterning fluid 26 causes densification of the primary metal particles 28 through capillary action and forms the densified green part 44'. The at least substantial evaporation of the patterning fluid 26 also results in the rebinding of the primary metal particles 28 with the temporary binder 29.

The stabilized, densified green part 44' exhibits handleable mechanical durability.

The densified green part 44' may then be extracted from the build material cake 46. The densified green part 44' may be extracted by any suitable means. In an example, the densified green part 44' may be extracted by lifting the densified green part 44' from the non-patterned build material granules 16. An extraction tool including a piston and a spring may be used.

When the densified green part 44' is extracted from the build material cake 46, the densified green part 44' may be removed from the build area platform 12 and placed in a heating mechanism. The heating mechanism may be the heat source 36.

In some examples, the densified green part 44' may be cleaned to remove unpatterned build material granules 16 from its surface. In an example, the densified green part 44' may be cleaned with a brush and/or an air jet.

Figure 3F:
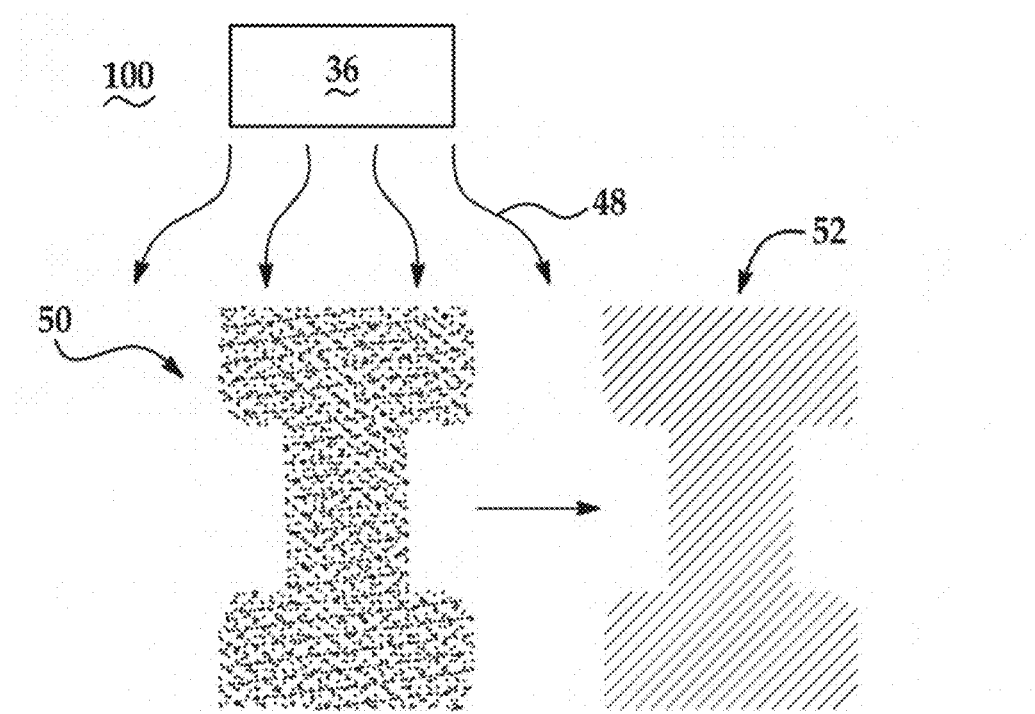

After the extraction and/or the cleaning of the densified green part 44', the densified green part 44' may be heated to remove the temporary binder 29 to produce an at least substantially binder-free gray part 50, as shown in FIG. 3F. Then, the at least substantially binder-free gray part 50 may be sintered to form the final 3D part 52, also as shown in FIG. 3F. Heating to de-bind and heating to sinter take place at two different temperatures, where the temperature for de-binding is lower than the temperature for sintering. Both the de-binding and the sintering heating stages are generally depicted in FIG. 3F, where heat or radiation to generate heat may be applied as denoted by the arrows 46 from the heat source 36.

Heating to de-bind is accomplished at a thermal decomposition temperature that is sufficient to thermally decompose the temporary binder 29. As such, the temperature for de-binding depends upon the temporary binder 29 of the build material granules 16. In an example, the thermal decomposition temperature ranges from about 250° C. to about 600° C. In another example, the thermal decomposition temperature ranges from about 280° C. to about 600° C., or to about 500° C. The temporary binder 29 may have a clean thermal decomposition mechanism (e.g., leaves non-volatile residue in an amount <5 wt % of the initial binder 29, and in some instances non-volatile residue in an amount <<1 wt % of the initial binder 29). The smaller residue percentage (e.g., close to 0%) is more desirable. During the de-binding stage, the temporary binder 29 decomposes first intro a liquid phase of lower viscosity. Capillary pressure developing during evaporation of this liquid pulls the primary metal particles 28 together leading to further densification and formation of the at least substantially binder-free gray part 50.

While not being bound to any theory, it is believed that the at least substantially binder-free gray part 50 may maintain its shape due, for example, to one or more of: i) the low amount of stress experience by the at least substantially binder-free gray part 50 due to it not being physically handled, ii) low level necking occurring between the primary metal particles 28 at the thermal decomposition temperature of the temporary binder 29, and/or iii) capillary forces pushing the primary metal particles 28 together generated by the removal of the temporary binder 29. The at least substantially binder-free gray part 50 may maintain its shape although the temporary binder 29 is at least substantially removed and the primary metal particles 28 are not yet sintered. Heating to form the substantially binder-free gray part 50 may begin the initial stages of sintering, which can result in the formation of weak bonds that are strengthened during final sintering.

Heating to sinter is accomplished at a sintering temperature that is sufficient to sinter the remaining primary metal particles 28. The sintering temperature is highly depending upon the composition of the primary metal particles 28. During heating/sintering, the at least substantially binder-free gray part 50 may be heated to a temperature ranging from about 80% to about 99.9% of the melting point or the solidus, eutectic, or peritectic temperature of the primary metal particles 28. In another example, the at least substantially binder-free gray part 50 may be heated to a temperature ranging from about 90% to about 95% of the melting point or the solidus, eutectic, or peritectic temperature of the primary metal particles 28. In still another example, the at least substantially binder-free gray part 50 may be heated to a temperature ranging from about 60% to about 90% of the melting point or the solidus, eutectic, or peritectic temperature of the primary metal particles 28. In still another example, the sintering temperature may range from about 10° C. below the melting temperature (e.g., the solidus temperature) of the primary metal particles 28 to about 50° C. below the melting temperature of the primary metal particles 28. In still another example, the sintering temperature may range from about 100° C. below the melting temperature (e.g., the solidus temperature) of the primary metal particles 28 to about 200° C. below the melting temperature of the primary metal particles 28. The sintering temperature may also depend upon the particle size and time for sintering (i.e., high temperature exposure time). As an example, the sintering temperature may range from about 600° C. to about 1800° C. In another example, the sintering temperature is at least 900° C. An example of a sintering temperature for bronze is about 850° C., and an example of a sintering temperature for stainless steel is about 1340° C. While these temperatures are provided as sintering temperature examples, it is to be understood that the sintering heating temperature depends upon the primary metal particles 28 that are utilized, and may be higher or lower than the provided examples. Heating at a suitable temperature sinters and fuses the primary metal particles 28 to form a completed 3D part 52, which may be even further densified relative to the at least substantially binder-free gray part 50. For example, as a result of sintering, the density may go from 50% density to over 90%, and in some cases very close to 100% of the theoretical density.

The length of time at which the heat 48 (for each of de-binding and sintering) is applied and the rate at which the part 44', 50 is heated may be dependent, for example, on one or more of: characteristics of the heat or radiation source 36, characteristics of the temporary binder 29, characteristics of the primary metal particles 28 (e.g., metal type, primary particle size, etc.), and/or the characteristics of the 3D part 52 (e.g., wall thickness).

The densified green part 44' may be heated at the thermal decomposition temperature for a thermal decomposition time period ranging from about 10 minutes to about 72 hours. Because the amount of the dissolved temporary binder in the densified green part 44' is low (e.g., from about 0.01 wt % to about 4.0 wt % based on the total wt % of the primary metal particles), the thermal decomposition time period may be 3 hours or less. In an example, the thermal decomposition time period is 60 minutes. In another example, thermal decomposition time period is 180 minutes. The densified green part 44' may be heated to the thermal decomposition temperature at a rate ranging from about 0.5° C./minute to about 20° C./minute. The heating rate may depend, in part, on one or more of: the amount of the dissolved temporary binder 29 in the densified green part 44', the porosity of the densified green part 44', and/or the characteristics of the densified green part 44'/3D part 52 (e.g., size, wall thickness, etc.).

The at least substantially binder-free gray part 50 may be heated at the sintering temperature for a sintering time period ranging from about 20 minutes to about 15 hours. In an example, the sintering time period is 30 minutes. In another example, the sintering time period is 120 minutes. In still another example, the sintering time period is less than or equal to 3 hours. The at least substantially binder-free gray part 50 may be heated to the sintering temperature at a rate ranging from about 1° C./minute to about 20° C./minute. In an example, the at least substantially binder-free gray part 50 is heated to the sintering temperature at a rate ranging from about 10° C./minute to about 20° C./minute. A high ramp rate up to the sintering temperature may be desirable to produce a more favorable grain structure or microstructure. However, in some instances, slower ramp rates may be desirable. As such, in another example, the at least substantially binder-free gray part 50 is heated to the sintering temperature at a rate ranging from about 1° C./minute to about 5° C./minute. In yet another example, the at least substantially binder-free gray part 50 is heated to the sintering temperature at a rate of about 1.2° C./minute. In still another example, the at least substantially binder-free gray part 50 is heated to the sintering temperature at a rate of about 2.5° C./minute.

In an example, the sintering temperature is below the solidus temperature of the primary metal particles 28; and the heating of the at least substantially binder-free, gray part 50 to the sintering temperature is performed for a sintering time period less than or equal to 3 hours. In another example, the sintering temperature ranges from about 10° C. below the melting temperature (e.g., the solidus temperature) of the primary metal particles 28 to about 50° C. below the melting temperature of the primary metal particles 28 for a sintering time period ranging from about 1 hour to about 2 hours. In still another example, the sintering temperature ranges from about 100° C. below the melting temperature (e.g., the solidus temperature) of the primary metal particles 28 to about 200° C. below the melting temperature of the primary metal particles 28 for a sintering time period ranging from about 30 minutes to about 1 hour. The wide temperature processing window and the relatively short sintering times are due, at least in part, to the face that the granules 16 have been physically broken down into the primary metal particles 28, which have a size particularly suitable for these processing conditions.

In some examples of the method 100, the heat 48 (for each of de-binding and sintering) is applied in an environment containing an inert gas, a low reactivity gas, a reducing gas, or a combination thereof. In other words, the heating of the densified green part 44' to the thermal decomposition temperature and the heating of the at least substantially binder-free gray part 50 to the sintering temperature are accomplished in an environment containing an inert gas, a low reactivity gas, a reducing gas, or a combination thereof. The de-binding may be accomplished in an environment containing an inert gas, a low reactivity gas, and/or a reducing gas so that the temporary binder 29 thermally decomposes rather than undergoing an alternate reaction which would fail to produce the at least substantially binder-free gray part 50 and/or to prevent the oxidation of the primary metal particles 28. The sintering may be accomplished in an environment containing an inert gas, a low reactivity gas, and/or a reducing gas so that the primary metal particles 28 will sinter rather than undergoing an alternate reaction (e.g., an oxidation reaction) which would fail to produce the metallic 3D part 52. Examples of inert gas include argon gas, helium gas, etc. An example of a low reactivity gas includes nitrogen gas, and examples of reducing gases include hydrogen gas, carbon monoxide gas, etc.

In other examples of the method 100, the heat 48 for each of de-binding (i.e., heating of the densified green part 44' to the thermal decomposition temperature) and sintering (i.e., heating of the at least substantially binder-free gray part 50 to the sintering temperature)) is applied in an environment containing carbon in addition to an inert gas, a low reactivity gas, a reducing gas, or a combination thereof. The de-binding and the sintering may be accomplished in an environment containing carbon to reduce the partial pressure of oxygen in the environment and further prevent the oxidation of the primary metal particles 28 during de-binding and sintering. An example of the carbon that may be placed in the heating environment includes graphite rods. In other examples, a graphite furnace may be used.

In still other examples of the method 100, the heat 48 (for each of de-binding and sintering) is applied in a low gas pressure or vacuum environment. The de-binding and the sintering may be accomplished in a low gas pressure or vacuum environment so that the temporary binder 29 thermally decomposes and/or to prevent the oxidation of the primary metal particles 28. Moreover, sintering at the low gas pressure or under vacuum may allow for more complete or faster pore collapse, and thus higher density parts. However, vacuum may not be used during sintering when the primary metal particles 28 (e.g., Cr) are capable of evaporating in such conditions. In an example, the low pressure environment is at a pressure ranging from about 1E-5 torr ($1'10^{-5}$ torr) to about 10 torr.

In still other examples of the method 100, the heat 48 (for each of de-binding and sintering) may be applied in an environment, including an environment that contains oxygen. In these examples, the primary metal particles 28 may have a low reactivity. Examples of primary metal particles 28 that may have a low reactivity include silver (Ag), gold (Au), and platinum (Pt).

Although not shown, the operations depicted in FIGS. 3E and 3F may be automated and the controller 32 may control the operations.

Figure 4:
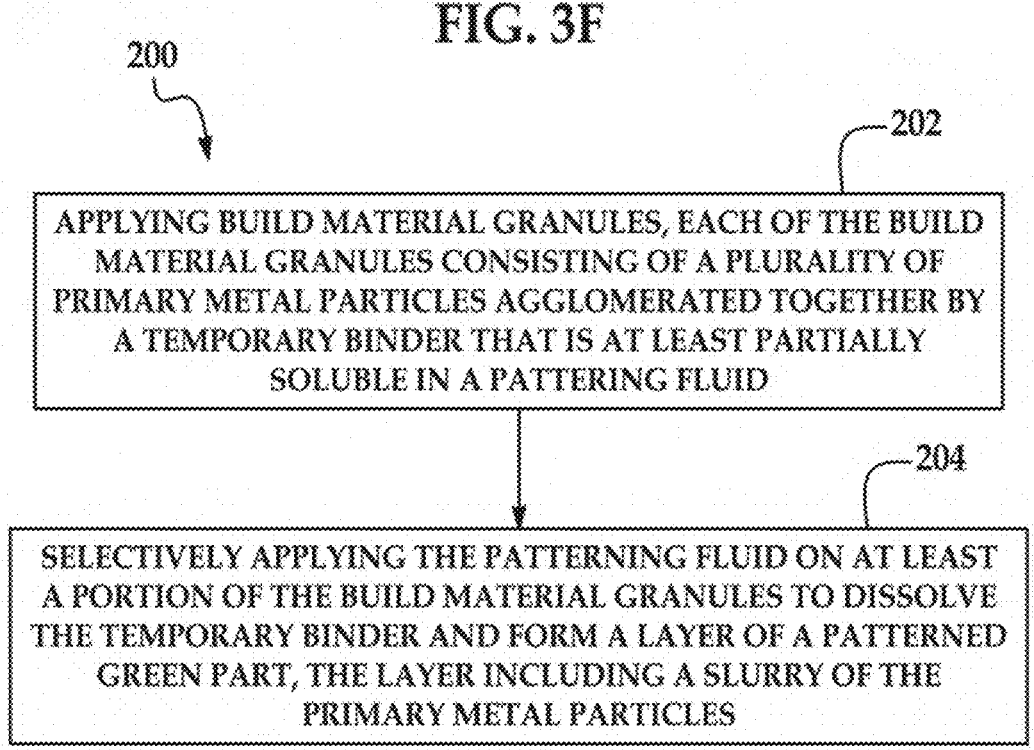
FIG. 4 is a flow diagram illustrating an example of a 3D printing method disclosed herein.

An example of the 3D printing method 200 is depicted in FIG. 4. It is to be understood that examples of the method 200 shown in FIG. 4 are discussed in detail herein, e.g., in FIGS. 3A through 3F and the text corresponding thereto.

As shown at reference numeral 202, the method 200 includes applying the build material granules 16, each of the build material granules 16 consisting of a plurality of primary metal particles 28 agglomerated together by the temporary binder 29 that is at least partially soluble in the patterning fluid 26.

As shown at reference numeral 204, method 200 further includes selectively applying the patterning fluid 26 on at least a portion 40 of the build material granules 16 to dissolve the temporary binder 29 and form a layer of a patterned green part 44, the layer including a slurry of the primary metal particles 28.

In an example, the method 200 further comprises repeating the applying of the build material granules 16 and the selectively applying of the patterning fluid 26 to create the patterned green part 44; and heating the patterned green part 44 to sinter the primary metal particles 28 to form a metallic part 52.

In another example of the method 200, the heating of the patterned green part 44 includes: heating the patterned green part 44 to a densification temperature to create a densified green part 44'; heating the densified green part 44' to a thermal decomposition temperature of the temporary binder 29 to remove the temporary binder 29 and create the at least substantially binder-free, gray part 50; and heating the at least substantially binder-free, gray part 50 to a sintering temperature to sinter the primary metal particles 28 to form the metallic part 52.

In some examples of the method 200, the densification temperature ranges from about 50° C. to about 250° C.; the thermal decomposition temperature ranges from about 250° C. to about 600° C.; and the sintering temperature ranges from about 600° C. to about 1800° C.

In some examples of the method 200, the applying of the build material granules 16, the selectively applying of the patterning fluid 26, the repeating of the applying and the selectively applying, and the heating of the patterned green part 44 to the densification temperature are accomplished on the build area platform 12; and after the heating of the patterned green part 44 to the densification temperature, the method further comprises: removing the densified green part 44' from the build area platform 12; and placing the densified green part 44' in a heating mechanism 36.

To further illustrate the present disclosure, an example is given herein. It is to be understood that this example is provided for illustrative purposes and is not to be construed as limiting the scope of the present disclosure.

EXAMPLE

Example build material granules were prepared. The primary metal particles used in the example build material granules were stainless steel powder particles (SS 316L) with an average particle size of about 15 µm. The temporary binder used in the example build material granules was CARBOSPERSE® K7028 (a short chain polyacrylic acid, M~2,300 Da, available from Lubrizol). SURFYNOL®465 (a non-ionic, ethoxylated acetylenic diol available from Air Products and Chemical Inc.) was also included in the example build material granules as a surfactant.

A mixture of the primary metal particles, the temporary binder, the surfactant, and water was formed. The general formulation of the mixture used to form the example build material granules is shown in Table 1, with the wt % of each component that was used.

TABLE 1

| Ingredient | Specific component | Mixture (wt %) |
| --- | --- | --- |
| Primary metal particles | Stainless steel powder (SS 316L, ~15 µm) | 82.00 |
| Temporary binder | CARBOSPERSE ® K7028 | 1.491 |
| Surfactant | SURFYNOL ® 465 | 0.33 |
| Water | | Balance |

Figure 5A:
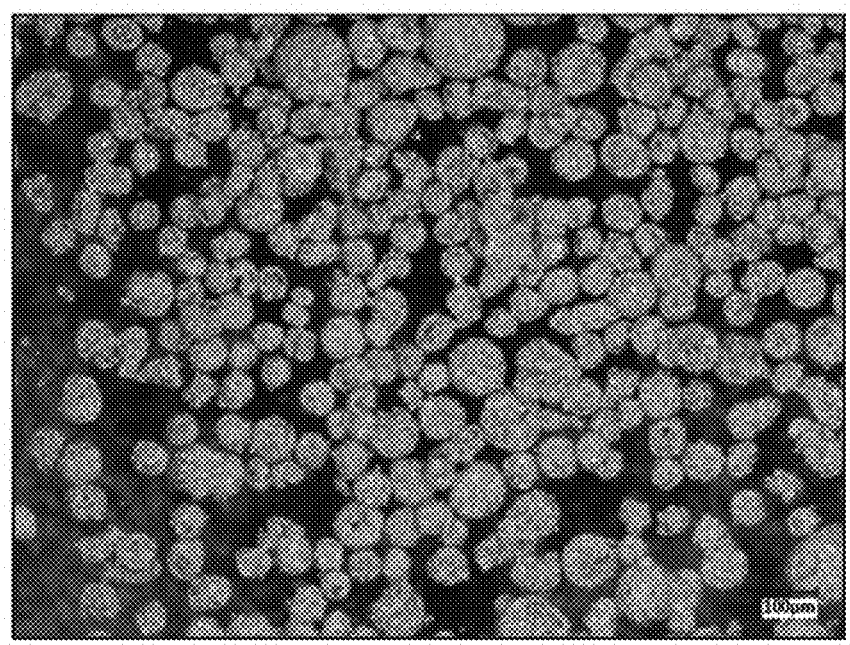
FIGS. 5A and 5B are optical microscopy images at 200× (i.e., 200 times) magnification, with a scale bar of 100 µm, of example build material granules (FIG. 5A) and a slurry layer of primary metal particles (FIG. 5B) that formed upon contacting the example build material granules with an example of a water-based patterning fluid.

The mixture was converted into frozen granules by spraying the mixture into liquid nitrogen ($N_2$) using a freeze granulation unit (LS-6 available from Powderpro AB). The frozen granules were converted into dry granular powder by freeze-drying. The granules formed were substantially spherical and had a granule size ranging from 30 µm to 150 µm. FIG. 5A is an optical microscopy image at 200× (i.e., 200 times) magnification, with a scale bar of 100 µm, that shows the example build material granules that were formed.

Figure 5B:
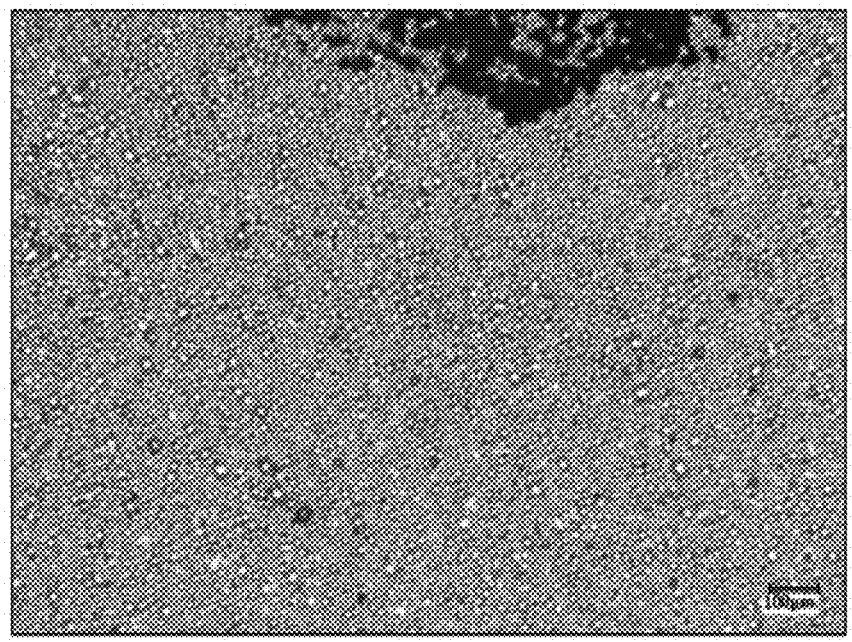

A water-based, example patterning fluid was applied to a layer of the example build material granules. The example build material granules instantly dispersed into a slurry of the primary metal particles and the fluid having binder dissolved therein. FIG. 5B is an optical microscopy image at 200× (i.e., 200 times) magnification, with a scale bar of 100 µm, that shows the slurry that formed when the example build material granules were contacted with water-based, example patterning fluid.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50° C. to about 250° C. should be interpreted to include the explicitly recited limits of from about 50° C. to about 250° C., and also to include individual values, such as 65° C., 135.5° C., 155° C., 180.85° C., 222° C., etc., and sub-ranges, such as from about 135° C. to about 230.5° C., from about 80.5° C. to about 170.7° C., from about 95° C. to about 191° C., etc. Furthermore, when "about" or the symbol "~" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
   applying build material granules, each of the build material granules consisting of a plurality of metal particles agglomerated together by a temporary binder that is at least partially soluble in a patterning fluid,
     wherein the temporary binder is selected from the group consisting of sugars, sugar alcohols, polymeric or oligomeric sugars, and combinations thereof;
   selectively applying the patterning fluid on at least a portion of the build material granules to dissolve the temporary binder and form a layer of a patterned green part, the layer including a slurry of the metal particles;
   repeating the applying of the build material granules and the selectively applying of the patterning fluid to create the patterned green part; and
   heating the patterned green part to sinter the metal particles to form a metallic part, wherein the heating of the patterned green part includes:
     heating the patterned green part to a densification temperature to create a densified green part;
     heating the densified green part to a thermal decomposition temperature of the temporary binder to remove the temporary binder and create an at least substantially binder-free, gray part; and
     heating the at least substantially binder-free, gray part to a sintering temperature to sinter the metal particles to form the metallic part.

2. The method as defined in claim 1 wherein:
   the metal particles are non-shape memory metal particles selected from the group consisting of iron, stainless steel, steel, copper, bronze, aluminum, tungsten, molybdenum, silver, gold, platinum, titanium, nickel, cobalt, non-shape memory alloys of any of these metals, and combinations thereof; and
   the temporary binder is present in an amount ranging from about 0.01 wt % to about 4.0 wt % based on a wt % of the metal particles.

3. The method as defined in claim 1 wherein:
the densification temperature ranges from about 50° C. to about 250° C.;
the thermal decomposition temperature ranges from about 250° C. to about 600° C.; and
the sintering temperature ranges from about 600° C. to about 1800° C.

4. The method as defined in claim 1 wherein the sintering temperature is below a solidus temperature of the metal particles, and wherein the heating of the at least substantially binder-free, gray part to the sintering temperature is performed for a sintering time period less than or equal to 3 hours.

5. The method as defined in claim 1 wherein:
the applying of the build material granules, the selectively applying of the patterning fluid, the repeating of the applying and the selectively applying, and the heating of the patterned green part to the densification temperature are accomplished on a build area platform; and
after the heating of the patterned green part to the densification temperature, the method further comprises:
removing the densified green part from the build area platform; and
placing the densified green part in a heating mechanism.

6. The method as defined in claim 1 wherein the heating of the densified green part to the thermal decomposition temperature and the heating of the at least substantially binder-free gray part to the sintering temperature are accomplished in an environment containing an inert gas, a low reactivity gas, a reducing gas, or a combination thereof.

7. The method as defined in claim 1 wherein prior to applying the build material granules, the method further comprises:

dispersing the metal particles in a mixture containing the temporary binder; and
spray drying the mixture containing the metal particles dispersed therein to create the build material granules.

8. The method as defined in claim 1 wherein:
each of the build material granules has a granule size ranging from about 10 μm to about 200 μm; and
each of the metal particles has a particle size ranging from about 1 μm to about 20 μm.

9. The method as defined in claim 1 wherein the patterning fluid consists of water.

10. The method as defined in claim 1 wherein the temporary binder is the sugar, and the sugar is selected from the group consisting of glucose ($C_6H_{12}O_6$), sucrose ($C_{12}H_{22}O_{11}$), and fructose ($C_6H_{12}O_6$).

11. The method as defined in claim 1 wherein the temporary binder is the sugar alcohol, and the sugar alcohol is selected from the group consisting of sorbitol ($C_6H_{14}O_6$), erythritol ($C_4H_{10}O_4$), and mannitol ($C_6H_{14}O_6$).

12. The method as defined in claim 1 wherein the temporary binder is the polymeric or oligomeric sugars, and the polymeric or oligomeric sugars are maltodextrines with a chain length ranging from 2 units to 20 units.

13. The method as defined in claim 1 wherein the patterning fluid includes water or a non-aqueous solvent and a radiation absorber present in an amount ranging from about 0.1 wt % to about 20 wt % based on a total weight of the patterning fluid.

14. The method as defined in claim 13 wherein the radiation absorber includes metal nanoparticles.

* * * * *